(12) United States Patent
Sharangpani

(10) Patent No.: US 7,119,577 B2
(45) Date of Patent: Oct. 10, 2006

(54) METHOD AND APPARATUS FOR EFFICIENT IMPLEMENTATION AND EVALUATION OF STATE MACHINES AND PROGRAMMABLE FINITE STATE AUTOMATA

(75) Inventor: Harshvardhan Sharangpani, Santa Clara, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 10/650,364

(22) Filed: Aug. 27, 2003

(65) Prior Publication Data

US 2004/0059443 A1 Mar. 25, 2004

Related U.S. Application Data

(60) Provisional application No. 60/406,835, filed on Aug. 28, 2002.

(51) Int. Cl.
G06F 7/38 (2006.01)
H03K 19/173 (2006.01)

(52) U.S. Cl. .................... 326/46; 704/232; 706/20; 700/48

(58) Field of Classification Search ................ 326/46; 712/232; 711/220, 203, 118; 700/12, 19, 700/11, 48; 704/232; 706/20
See application file for complete search history.

(56) References Cited

U.S. PATENT DOCUMENTS

| | | | |
|---|---|---|---|
| 4,965,472 A * | 10/1990 | Anderson | 326/46 |
| 5,163,016 A | 11/1992 | Har'El et al. | |
| 5,623,680 A | 4/1997 | Flora-Holmquist et al. | |
| 5,905,902 A | 5/1999 | O'Connor | |
| 5,949,251 A | 9/1999 | Chambers | |
| 6,212,625 B1 | 4/2001 | Russell | |
| 6,253,112 B1 | 6/2001 | Flora-Holmquist et al. | |
| 6,266,634 B1 | 7/2001 | Buchsbaum et al. | |
| 6,327,508 B1 | 12/2001 | Mergard | |
| 6,380,924 B1 | 4/2002 | Yee et al. | |
| 2003/0120480 A1 | 6/2003 | Mohri et al. | |
| 2005/0012521 A1 | 1/2005 | Sharangpani | |

FOREIGN PATENT DOCUMENTS

| | | |
|---|---|---|
| WO | WO 94/19757 | 9/1994 |
| WO | WO 2004/063886 | 7/2004 |

OTHER PUBLICATIONS

PCT Search Report mailed Mar. 8, 2004, International Application No. PCT/US03/27292, 5 pages.

(Continued)

*Primary Examiner*—Daniel Chang
(74) *Attorney, Agent, or Firm*—Blakely, Sokoloff, Taylor & Zafman LLP

(57) ABSTRACT

A method and apparatus for efficient implementation and evaluation of state machines and programmable finite state automata is described. In one embodiment, a state machine architecture comprises a plurality of node elements, wherein each of the plurality of node elements represents a node of a control flow graph. The state machine architecture also comprises a plurality of interconnections to connect node elements, a plurality of state transition connectivity control logic to enable and disable connections within the plurality of interconnections to form the control flow graph with the plurality of node elements, and a plurality of state transition evaluation logic coupled to the interconnections and operable to evaluate input data against criteria, the plurality of state transition evaluation logic to control one or more state transitions between node elements in the control flow graph.

24 Claims, 13 Drawing Sheets

OTHER PUBLICATIONS

Alfred V. Aho, et al., "Compilers: Principles, Techniques, and Tools," Addison-Wesley Publishers, pp. i-x, and 83-278 (Mar. 1988).

Danield Jurafsky and James H. Martin, "Speech and Language Processing: An Introduction to Natural Language Processing, Computational Linguistics, and Speech Recongnition," Prentice Hall Inc., pp. i-xxvi and 1-90 (2000).

* cited by examiner

| PROPERTIES OF DFA AND NFA TECHNIQUES USED ON CONVENTIONAL MICROPROCESSORS | STORAGE BOUND ON # OF STATES (FOR R CHARACTER REGULAR EXPRESSION) | EVALUATION TIME (FOR N BYTES OF INPUT) [ORDER OF] |
|---|---|---|
| DETERMINISTIC FINITE STATE AUTOMATA OR DFA RUNNING ON A GP CPU | $2^R$ (NEEDS VERY LARGE MEMORY) | N MEMORY ACCESS CYCLES |
| NON-DETERMINISTIC FINITE STATE AUTOMATA NFA RUNNING ON A GP CPU | R | R * N CPU CACHE+BRANCH CYCLES |

FIG. 1A
(PRIOR ART)

| PROPERTIES OF DFA AND NFA TECHNIQUES USED ON CONVENTIONAL MICROPROCESSORS | STORAGE: BOUND ON # OF STATES (FOR R CHARACTERS) | EVALUATION TIME (FOR N BYTES) [ORDER OF] |
|---|---|---|
| DETERMINISTIC FINITE STATE AUTOMATA OR DFA RUNNING ON A GP CPU | $2^R$ (NEEDS VERY LARGE MEMORY) | N MEMORY ACCESS CYCLES (~100ns) |
| NON-DETERMINISTIC FINITE STATE AUTOMATA OR NFA RUNNING ON A GP CPU | R | R * N CPU CACHE+BRANCH CYCLES (~4ns) |
| NON-DETERMINISTIC FINITE STATE AUTOMATA OR NFA RUNNING ON THE APPARATUS | R | N TIGHT ON CHIP STATE TRANSITION CYCLE (~1 ns) |

FIG. 9A
(PRIOR ART)

METHOD AND APPARATUS FOR EFFICIENT IMPLEMENTATION AND EVALUATION OF STATE MACHINES AND PROGRAMMABLE FINITE STATE AUTOMATA

This application is a non-provisional application of U.S. Provisional Patent Application Ser. No. 60/406,835, filed Aug. 28, 2002.

FIELD OF THE INVENTION

The present invention relates to the field of information processing, specifically the field of content analytics and processing.

BACKGROUND OF THE INVENTION

Significant trends in computing and communications are leading to the emergence of environments that abound in content analytics and processing. These environments require high performance as well as programmability on a certain class of functions, namely searching, parsing, analysis, interpretation, and transformation of content in messages, documents, or packets. Notable fields that stress such rich content analytics and processing include content-aware networking, content-based security systems, surveillance, distributed computing, wireless communication, human interfaces to computers, information storage and retrieval systems, content search on the semantic web, bio-informatics, and others.

The field of content-aware networking requires searching and inspection of the content inside packets or messages in order to determine where to route or forward the message. Such inspection has to be performed on in-flight messages at "wire-speed", which is the data-rate of the network connection. Given that wire rates in contemporary networks range from 100 Mbits/second all the way to 40 Gbits/second, there is tremendous pressure on the speed at which the content inspection function needs to be performed.

Content-based security systems and surveillance and monitoring systems are required to analyze the content of messages or packets and apply a set of rules to determine whether there is a security breach or the possibility of an intrusion. Typically, on modern network intrusion detection systems (NIDS), a large number of patterns, rules, and expressions have to be applied to the input payload at wire speed to ensure that all potential system vulnerabilities are uncovered. Such rules and patterns need to be applied and analyzed within the context of the state of the network and the ongoing transaction. Hence sophisticated state machines need to be evaluated in order to make the appropriate determination. Given that the network and computing infrastructure is continuously evolving, fresh vulnerabilities continue to arise. Moreover, increasingly sophisticated attacks are employed by intruders in order to evade detection. Intrusion detection systems need to be able to detect all known attacks on the system, and also be intelligent enough to detect unusual and suspicious behavior that is indicative of new attacks. All these factors lead to a requirement for both programmability as well as extremely high performance on content analysis and processing.

With the advent of distributed and clustered computing, tasks are now distributed to multiple computers or servers that collaborate and communicate with one another to complete the composite job. This distribution leads to a rapid increase in computer communication, requiring high performance on such message processing. With the emergence of XML (Extensible Markup Language) as the new standard for universal data interchange, applications communicate with one another using XML as the "application layer data transport". Messages and documents are now embedded in XML markup. All message processing first requires that the XML document be parsed and the relevant content extracted and interpreted, followed by any required transformation and filtering. Since these functions need to be performed at a high message rate, they become computationally very demanding.

With the growth of untethered communication and wireless networks, there is an increase in the access of information from the wireless device. Given the light form factor of the client device, it is important that data delivered to this device be filtered and the payload be kept small. Environments of the future will filter and transform XML content from the wireline infrastructure into lightweight content (using the Wireless Markup Language or WML) on the wireless infrastructure. With the increasing use of wireless networks, this content transformation function will be so common that an efficient solution for it's handling will be needed.

Another important emerging need is the ability to communicate and interact with computers using human interfaces such as speech. Speech processing and natural language processing is extremely intensive in content search, lexical analysis, content parsing, and grammar processing. Once a voice stream has been transduced into text, speech systems need to apply large vocabularies as well as syntactic and semantic rules on the incoming text stream to understand the speech. Such contextual and stateful processing can be computationally very demanding.

The emergence and growth of the worldwide web has placed tremendous computational load on information retrieval (IR) systems. Information continues to be added to the web at a high rate. This information typically gets fully indexed against an exhaustive vocabulary of words and is added to databases of search engines and IR systems. Since information is continuously being created and added, indexers need to be "always-on". In order to provide efficient real-time contextual search, it is necessary that there be a high performance pattern-matching system for the indexing function.

Another field that stresses rich content analytics and processing is the field of bio-informatics. Gene analytics and proteomics entail the application of complex search and analysis algorithms on gene sequences and structures. Once again, such computation requires high performance search, analysis, and interpretation capability.

Thus, emerging computer and communications environments of the future will stress rich analysis and processing of content. Such environments will need efficient and programmable solutions for the following functions—stateful and contextual inspection, searching, lexical analysis, parsing, characterization, interpretation, filtering and transformation of content in documents, messages, or packets. Central to these rich content processing functions is the capability to efficiently evaluate state machines against an input data stream.

The history of state machines dates back to early computer science. In their simplest formulation, state machines are formal models that consist of states, transitions amongst states, and an input representation. Starting with Turing's model of algorithmic computation (1936), state machines have been central to the theory of computation. In the 1950s, the regular expression was developed by Kleene as a formal notation to describe and characterize sets of strings. The finite state automaton was developed as a state machine model that was found to be equivalent to the regular expression. Non-deterministic automata were subsequently developed and proven to be equivalent to deterministic automata. Subsequent work by Thompson and others led to a body of construction algorithms for constructing finite state automata to evaluate regular expressions. A large number of references are available for descriptions of Regular Expressions and Finite State Automata. For a reference text on the material, see "Speech and Language Processing" (by Daniel Jurafsky and James H. Martin, Prentice-Hall Inc, 2000). The regular expression has evolved into a powerful tool for pattern matching and recognition, and the finite automaton the standard technique to implement a machine to evaluate it.

Using techniques available in the prior art, state machine and finite state automata processing can be performed in one of three ways. First, such processing has been performed using fixed application specific integrated circuits (ASIC) solutions that directly implement a fixed and chosen state machine that is known apriori. Although the fixed ASIC approach can increase performance, it lacks programmability, and hence its application is severely restricted. Furthermore, the expense associated with designing and tailoring specific chips for each targeted solution is prohibitive.

Second, Field Programmable Gate Arrays (FPGA) can be used to realize state machines in a programmable manner. Essentially, the FPGA architecture provides generalized programmable logic that can be configured for a broad range of applications, rather than being specially optimized for the implementation of state machines. Using this approach, one can only accommodate a small number of state machines on a chip, and furthermore the rate at which evaluation can progress is limited. The density and performance characteristics of the implementations make this choice of solution inadequate for the broad range of emerging applications.

Third, traditional general-purpose microprocessors have been used to implement a variety of state machines. Microprocessors are fully programmable devices and are able to address the evolving needs of problems—by simply reprogramming the software the new functionality can be redeployed. However, the traditional microprocessor is limited in the efficiency with which it can implement and evaluate state machines. These limitations will now be described.

FIG. 1($a$) summarizes the limitations of the microprocessor based paradigm when implementing Finite State Automata. Two implementation options exist—first, the Deterministic Finite State Automata approach (DFA), and second, the Non-Deterministic Finite State Automata approach. The two options are compared on their ability to implement an R-character regular expression and evaluate it against N bytes of an input data stream. In either approach, the regular expression is mapped into a state machine or finite state automata with a certain number of states. For a microprocessor based solution, the amount of storage required to accommodate these states is one goodness metric for the approach. The second key metric is the total amount of time needed to evaluate the N-byte input data stream.

In the DFA approach, the bound on the storage required for the states for an R-character regular expression is $2^R$. Hence a very large amount of storage could be needed to accommodate the states. The common way to implement a DFA is to build a state transition table, and have the microprocessor sequence through this table as it progressively evaluates input data. The state transition table is built in memory. The large size of the table renders the cache subsystem in commercial microprocessors to be ineffective and requires that the microprocessor access external memory to lookup the table on every fresh byte of input data in order to determine the next state. Thus the rate at which the state machine can evaluate input data is limited by the memory access loop. This is illustrated in FIG. 1($b$). For N bytes of input stream, the time taken to evaluate the state machine is proportional to N accesses of memory. On typical commercial computer systems currently available in 2003, the memory access latency is of the order of 100 nanoseconds. Hence the latency of state machine evaluation is of the order of N×100 ns. This would limit the data rate that can be evaluated against the state machine to be ~100 Mbps. If it is desired to evaluate multiple regular expressions in parallel, one option is to implement these expressions in distinct tables in memory, with the microprocessor sequentially evaluating them one after the other. For K parallel regular expressions, the evaluation time would then degrade to K*N*100 ns, while the bound on the storage would grow to $K*2^R$. The other alternative is to compile all the regular expressions into a single monolithic DFA and have the microprocessor sequence through this table in one single pass. For K parallel regular expressions, the bound on the storage would grow to $2^{(K*R)}$, while the evaluation time would remain N*100 ns. The storage needed for such an approach could be prohibitive. To implement a few thousand regular expressions, the storage needed could exceed the physical limits of memory available on commercial systems.

In the NFA approach, the bound on the storage required for an R-character regular expression is proportional to R. Hence storage is not a concern. However, in an NFA, multiple nodes could make independent state transitions simultaneously, each based on independent evaluation criteria. Given that the microprocessor is a scalar engine which can execute a single thread of control in sequential order, the multiple state transitions of an NFA require that the microprocessor iterate through the evaluation of each state sequentially. Hence, for every input byte of data, the evaluation has to be repeated R times. Given that the storage requirements for the scheme are modest, all the processing could be localized to using on-chip resources, thus remaining free of the memory bottleneck. Each state transition computation is accomplished with on-chip evaluation whose performance is limited by the latency of access of data from the cache and the latency of branching. Since modern microprocessors are highly pipelined (of the order of 20–30 stages in products like the Pentium-III and Pentium-IV processors from Intel Corp. of Santa Clara, Calif.), the performance penalty incurred due to branching is significant. Assuming a 16 cycle loop for a commercial microprocessor running at 4 GHz, the evaluation of a single state transition could take order of 4 nanoseconds. Thus, evaluating an N-byte input stream against an R-state NFA for an R-character regular expression would need N*R*4 nanoseconds. For K parallel regular expressions, the microprocessor would sequence through each, taking K*N*R*4 nanoseconds. Note that for just 4 parallel regular expressions with say 8 states each, the data rate would once again be limited to around 100 Mbps.

These data points indicate that the conventional microprocessor of 2003 or 2004 will be able to deliver programmable state machine evaluation on input data at rates around the 100 Mbps range. However, in this timeframe, data rates of between 1 Gbps to 10 Gbps will not be uncommon in enterprise networks and environments. Clearly, there is a severe mismatch of one to two orders of magnitude between the performance that can be delivered by the conventional microprocessor and that which is demanded by the environment. While it is possible to employ multiple parallel microprocessor systems to execute some of the desired functions at the target rate, this greatly increases the cost of the system. There is clearly a need for a more efficient solution for these target functions.

SUMMARY OF THE INVENTION

A method and apparatus for efficient implementation and evaluation of state machines and programmable finite state automata is described. In one embodiment, a state machine architecture comprises a plurality of node elements, wherein each of the plurality of node elements represents a node of a control flow graph. The state machine architecture also comprises a plurality of interconnections to connect node elements, a plurality of state transition connectivity control logic to enable and disable connections within the plurality of interconnections to form the control flow graph with the plurality of node elements, and a plurality of state transition evaluation logic coupled to the interconnections and operable to evaluate input data against criteria, the plurality of state transition evaluation logic to control one or more state transitions between node elements in the control flow graph.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1(a) illustrates storage and performance limitations of state machine techniques in the prior art.

FIG. 9(a) illustrates storage and performance benefits of an embodiment of exemplary state machine architecture on state machine techniques over the prior art.

DETAILED DESCRIPTION OF THE PRESENT INVENTION

Figure 1B:
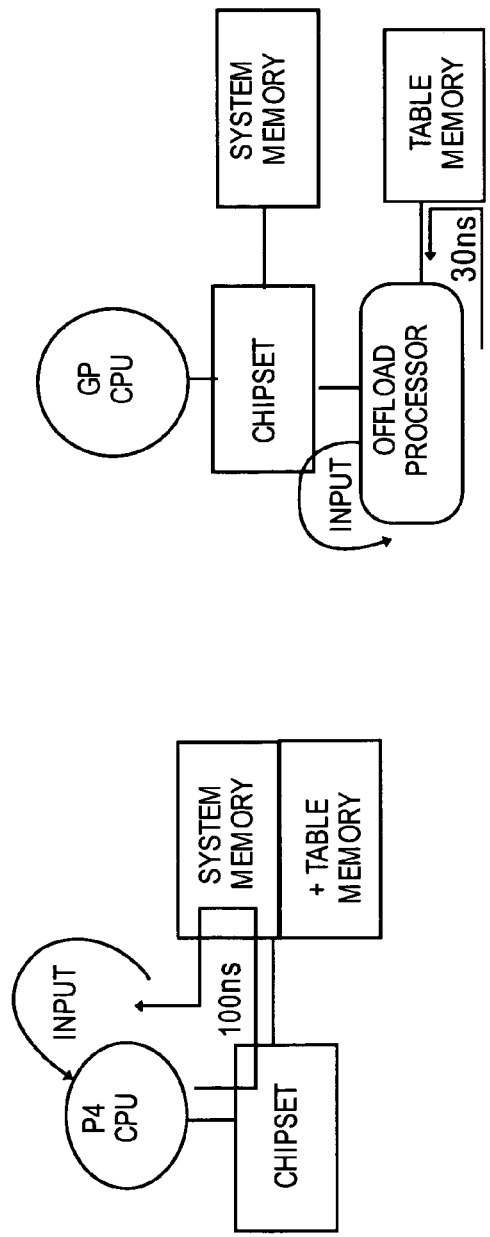
FIG. 1(b) illustrates the memory bottleneck in state machine techniques in the prior art.

A programmable apparatus is disclosed herein for implementation and evaluation of state machines and finite state automata. The apparatus employs a technique of building graphs using circuits in a way that enables, in a programmable manner, the physical realization of almost any arbitrary control flow graph in hardware. Embodiments of the apparatus provide a high performance and compact solution for evaluation of multiple and complex state machines. Embodiments of the apparatus can be used for efficient parsing and evaluation of data via the hierarchical application of thousands of rule-trees on the data, as well as for conducting high-speed contextual searches of arbitrarily long patterns in a document, message, or other content.

In one embodiment, the hardware comprises a set of storage elements, or node elements, used to hold values that represent nodes of a control flow graph or states of a state machine, a set of wires, or interconnections, between nodes used to represent arcs of the control flow graph or state transitions of the state machine, a set of programmable connectivity controls that can be used to enable or disable any of the interconnections between any of the nodes, a set of programmable evaluation symbols to be applied against input data with the results being used to trigger the transfer of values between node elements or state transitions between node elements. In one embodiment, additional controls are included to initialize, evaluate, and terminate the state machine evaluation. By programming the controls and symbols, the apparatus can be configured to implement any given state machine.

In one embodiment, for each evaluation cycle, fresh data is streamed into the apparatus and applied against the evaluation symbols, triggering state transitions across the node elements. In one embodiment, each of multiple node elements independently make parallel state transitions to multiple other node elements. The apparatus can be used to realize fast and efficient implementations of finite state automata. The specification of a non-deterministic finite state automata (NFSA or NFA) naturally maps to the apparatus.

In one embodiment, all the nodes of a control flow graph or states of a state machine are instantiated into storage elements or node elements in hardware, and all the arcs or state transitions of the state machine are instantiated into wires or interconnections between the nodes. The connectivity between the nodes is either provided to be complete (fully connected) or partially connected. The connectivity is additionally enhanced with enable/disable controls that can selectively turn existing connections on or off. In one embodiment, these controls are programmable. By programming in a specific set of control values, selected interconnections can be enabled, thus leading to the realization of any arbitrary control flow graph. In this basic setup, values can be transferred from one node element to another, by travelling over an enabled wire or interconnection, leading to a valid state transition. In one embodiment, the apparatus is additionally enhanced such that a state transition across a wire or interconnection is gated by a trigger signal. In such a case, for each interconnection, a trigger signal is computed by evaluating input data against specific criteria. In one embodiment, these criteria (referred to herein as evaluation symbols) are programmable. By programming in a specific set of evaluation symbols numerous arbitrary state machine can be realized.

In one embodiment, simple flip-flops are used to implement the storage elements and simple switches realized as logic gates are used to implement the connectivity controls. In one embodiment, the implementation of the apparatus maps to a simple and regular structure which can be made very dense.

By putting down a large number of nodes in hardware, large and complex state machines can be implemented using the techniques described herein. Alternatively, a hierarchical implementation strategy can be employed to further exploit any sparseness in the overall control flow graph. The overall control flow graph of the target state machine could be broken into sparsely connected groups of dense sub-graphs or smaller state machines. Using this approach, a hierarchically organized tree of rules or smaller state machines can be instantiated on a chip.

A convenient implementation option is to first develop a building block of a given size (number of nodes) and then replicate it multiple times, yielding multiple smaller state machines. These smaller state machines can either be used as a pool of independent state machines, or combined together to construct a larger machine. The latter can be accomplished by connecting the smaller state machines using an interconnect fabric. Such a fabric can follow the same approach used to create the basic apparatus, by treating each smaller state machine itself as a node of the larger graph. Such an approach can be very effective in delivering an improved solution. By selecting a size (in terms of number of nodes) that adequately serves the target domains of choice, one can focus on it's implementation and make it compact. When coupled with an interconnect fabric, larger and more complex machines, and hence powerful state machine evaluation capability can be accommodated on a single chip. For example, using 0.13u silicon process technology, a first implementation of one embodiment can accommodate several thousand state machines (each comprised of, for example, 16-state non-deterministic finite state automata) on a single chip.

Figure 2:
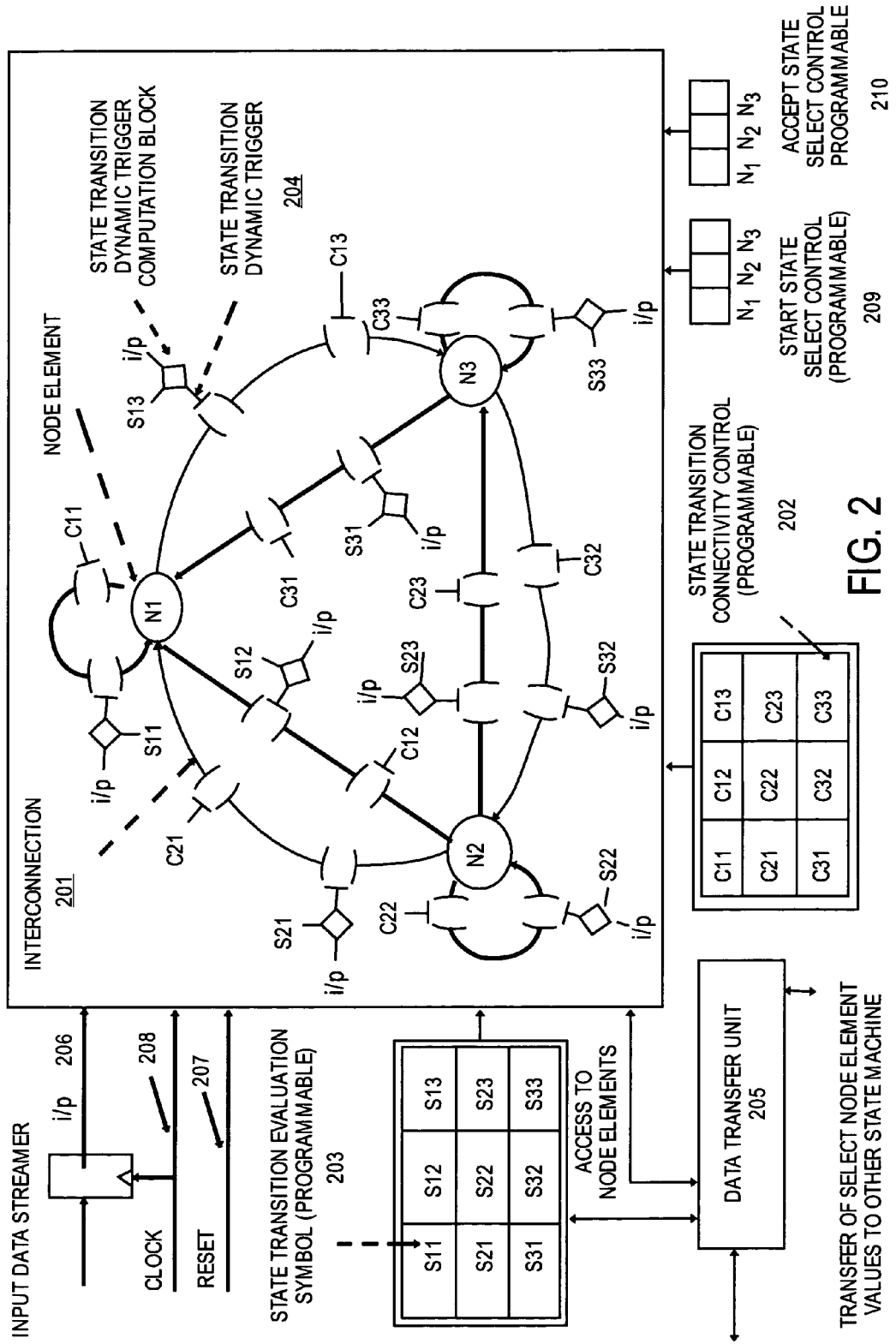
FIG. 2 illustrates one embodiment of a state machine architecture for a state machine with 3 states.

FIG. 2 illustrates a sample embodiment of the state machine evaluation apparatus for a state machine with 3 nodes. Practical realizations of the architecture will comprise machines with a larger number of nodes, but 3 nodes is chosen for the purpose of illustration simplicity. Key elements of the state machine evaluation architecture will now be described.

(1) Elements N1, N2 and N3 represent a set of storage elements known as node elements (e.g., node elements N1, N2, and N3). Each storage element or group of elements can be used to hold values that represent states of a state machine or nodes of a control flow graph. Multiple nodes can be simultaneously active at any given time.

(2) A set of wires or interconnections 201 are used to fully or partially interconnect the node elements N1, N2, and N3, and to read, write, and transfer values across the node elements N1, N2, and N3. Each wire or interconnection 201 can be used to represent a distinct arc of a control flow graph, so that the presence of an interconnection between two node elements can be treated as the presence of an arc connecting the two nodes. Alternatively, each wire or interconnection 201 can be used to represent distinct state transitions of a state machine. The presence of an interconnection 201 between two node elements or states can be treated as a possible state transition between the two states. The actual transfer of a value from one node element to another through the interconnection can be treated as an actual state transition. Multiple state transitions can simultaneously occur at any given time. In FIG. 2, the node elements N1, N2, and N3 are fully connected to one another.

(3) A set of storage elements contains values referred to herein as state transition connectivity controls 202. These values of the state transition connectivity controls 202 are used to enable or disable a particular interconnection between node elements (e.g., node elements N1, N2 and N3). Accompanying these controls is a mechanism by which the interconnections between node elements can be enabled or disabled by the state transition connectivity controls, as is described in more detail below.

(4) A set of storage elements contains specifications for operations and data. These specifications are referred to herein as state transition evaluation symbols 203. Accompanying these symbols is a mechanism by which the state transition evaluation symbols can be coupled to input data. Through this mechanism, the symbols are applied against the input data to compute an output which is referred to herein as the state transition dynamic trigger 204. In one embodiment, the symbols comprise a comparison operation and a single 8-bit character value, so that input data is specified for comparison to the 8-bit character value to compute the state transition dynamic trigger 204. In another embodiment, richer and more complex operators could be combined with datasets to offer richer evaluation symbols. For example, the symbol could comprise an arithmetic operation such as a subtraction or a range computation.

(5) The state transition dynamic trigger 204 governs the update and transfer of values between node elements across interconnections that have been enabled by the state transition connectivity controls 202.

(6) A data transfer unit 205 is provided, through which data (e.g., dynamically computed data) can be fed to the storage containing the state transition connectivity controls 202. Thereby the state transition connectivity controls 202 can be programmed and configured dynamically, enabling dynamic realization of a range of control flow graph structures or configurations. In one embodiment, the data transfer unit 205 also provides a mechanism through which data (e.g., dynamically computed data) can be fed to the storage containing the state transition evaluation symbols 203. Thereby the state transition evaluation symbols 203 and the computation of the state transition dynamic triggers 204 can be programmed and configured dynamically. The data transfer unit 205 also provides a mechanism to access and sample the node elements and to program them with initialization values. The data transfer unit 205 also provides a mechanism to couple the apparatus to other similar apparatus to construct larger state machines or graphs.

(7) Additionally, the apparatus may have a dedicated mechanism to reset the entire apparatus, such as reset line 207.

(8) An input data streamer 206 provides a mechanism to feed the entire apparatus with an input stream. Each evaluation cycle, fresh data is presented to the apparatus, and applied against the evaluation symbols, triggering state transitions across the node elements. In one embodiment, input data streamer 206 feeds the input stream of data to the state machine architecture based on clock 208, which also clocks the state machine architecture.

(9) Optionally, the machine may have additional mechanisms to control the progress of the state machine evaluation. Start state select control 209 and accept state select controls 210 are bit vectors which designate specific node elements to be start and accept state nodes. The designated start states begin active after initialization of the machine. Once the machine enters in any of the accept states, it stops further evaluation. The accept state indicates a completion of the task for which the state machine is configured. For example, in the case of contextual searching, an accept state indicates a match of the pattern in the input stream.

As can be seen in FIG. 2, a state machine apparatus with R nodes has $R^2$ arcs, and $R^2$ symbols. In FIG. 2, R=3.

Use of the Architecture for Evaluation of Regular Expressions

The state machine architecture described is especially useful for implementation of programmable finite state automata to evaluate regular expressions. Regular expressions are equivalent to Finite State automata.

Figure 3A:
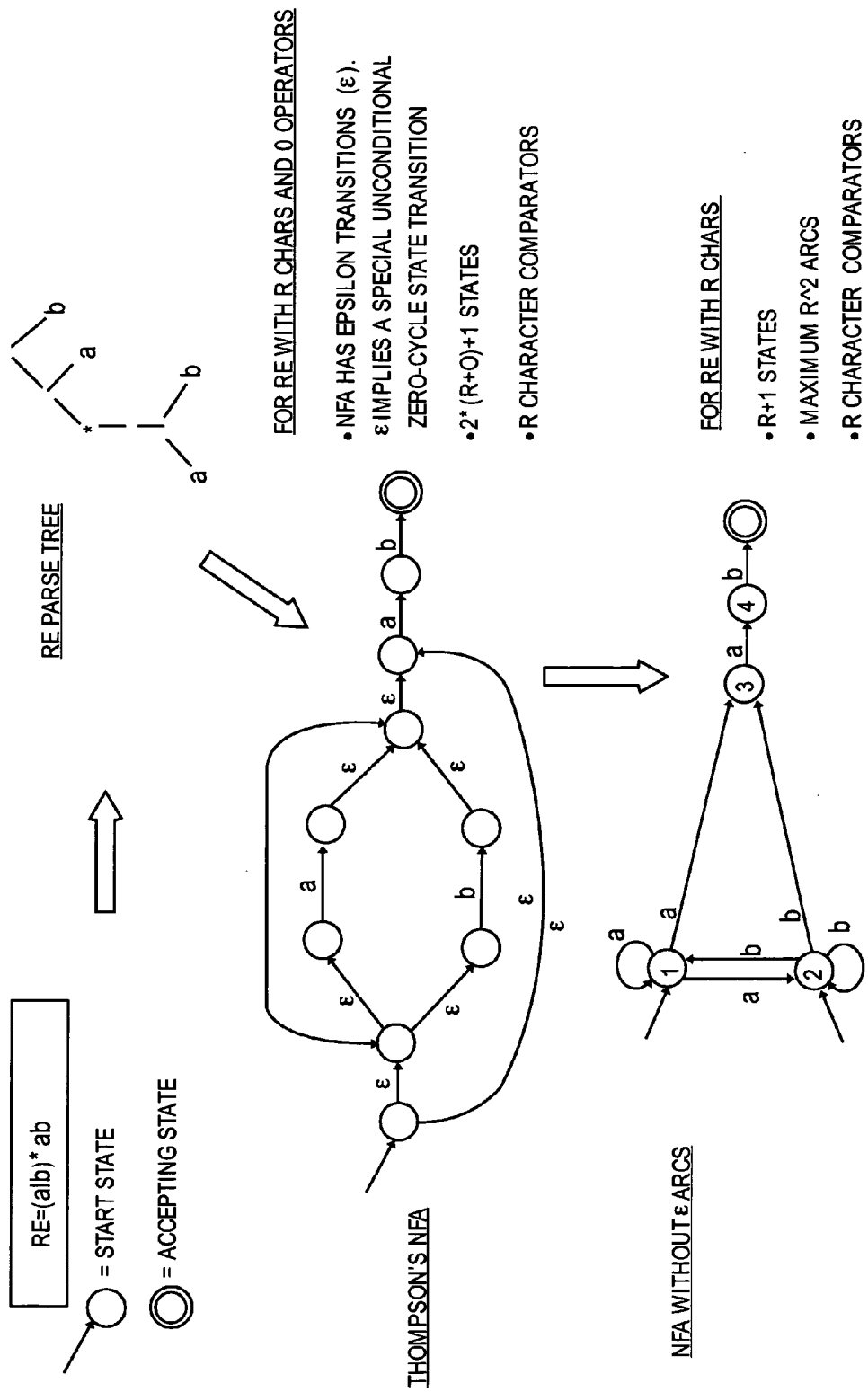
FIG. 3(a) shows how a regular expression is mapped to a finite state machine description of a non-deterministic finite state automata (NFA).

FIG. 3(a) illustrates a sample regular expression and its mapping to a finite state machine specification. Numerous algorithms exist in the prior art for such mapping and for constructing the finite state automata. [Several sources and texts exist for this material. For a detailed treatment of various algorithms, see the following reference: "Compilers: Principles, Techniques, and Tools" by Alfred V. Aho, Ravi Sethi, Jeffrey D. Ullman]. Notable algorithms include Thompson's construction and the Berry-Sethi construction. These algorithms map a regular expression comprising of a given number of characters and operators to a finite state automata. Goodness metrics for these algorithms include the significant characteristics of the constructed finite state automata. These characteristics include the number of states, number of state transition arcs, and number of state transition evaluation symbols needed to implement the state machine. It is important to point out that a certain class of construction algorithms (commonly referred to as Left-biased constructions, Right-Biased constructions, or Berry-Sethi-like constructions) lead to a mapping of an R-character regular expression to a finite state automata with R+1 states, a maximum of $R^2$ arcs, and R symbols. Such a construction allows a further savings in hardware in the design of the apparatus for regular expression processing. Instead of building an R-node state machine with $R^2$ evaluation symbols (one symbol per arc), one only needs to provide R evaluation symbols (one per node). Thus one only needs to provide one evaluation symbol and associated dynamic trigger computation hardware for each node. All arcs either emanating out of the node or feeding into the node are gated by this trigger. The design decision between triggering all arcs feeding into a node versus triggering all arcs emanating out from a node leads to a decision to choose between a Left-biased vs a Right-Biased construction algorithm. By exploiting this property, there is a reduction in the number of symbols needed to be stored, as well as the hardware needed to evaluate these symbols against the input stream. There is also a concomitant reduction in the hardware needed to couple the state transition dynamic triggers (e.g., 204) to the interconnections 201.

Figure 3B:
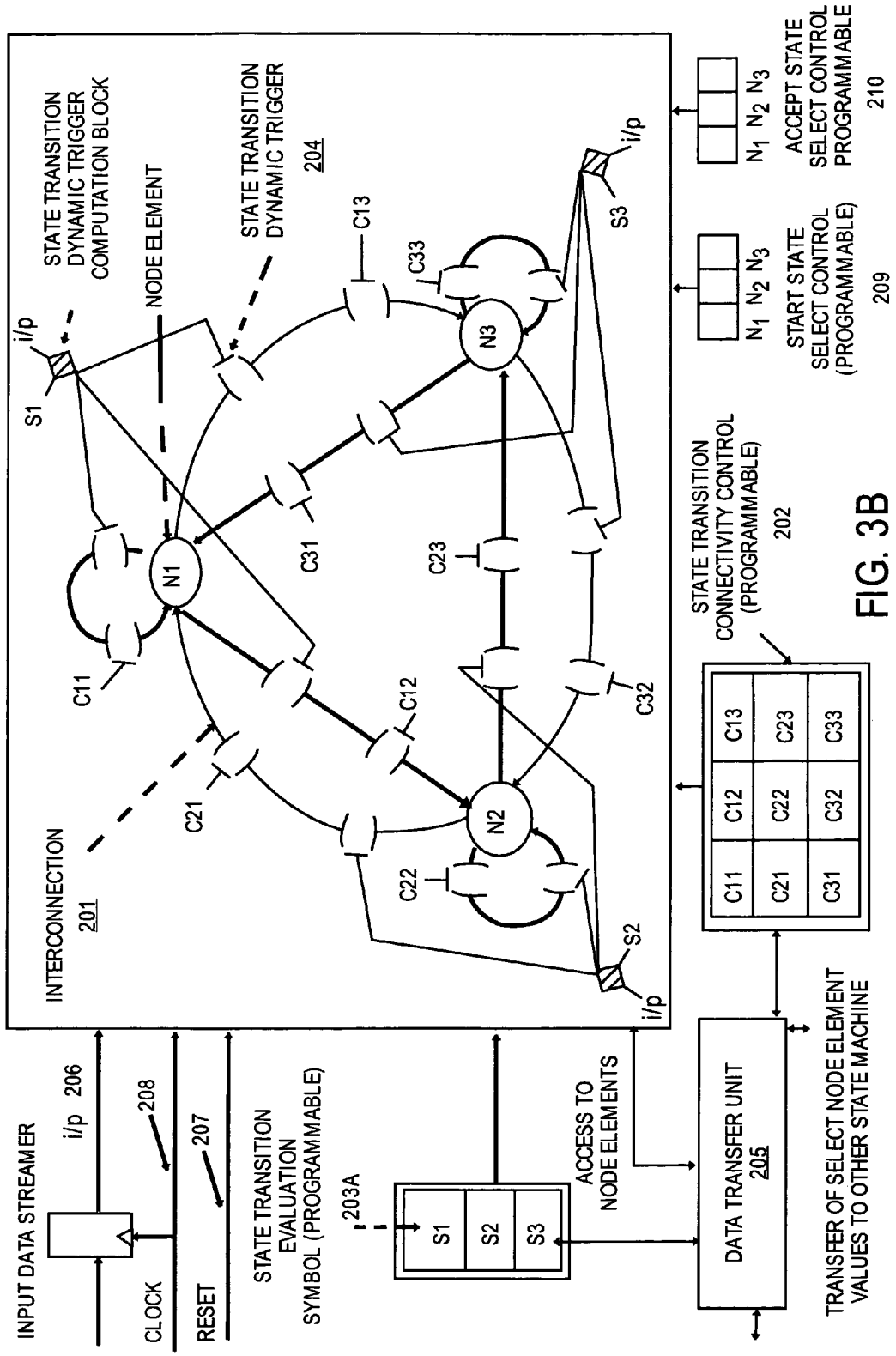
FIG. 3(b) illustrates use of the state machine to evaluate a 3-state non-deterministic finite state automata (NFA) with 1 evaluation symbol per node element.

FIG. 3(b) illustrates how the state machine architecture can take advantage of specific construction algorithms to implement an R-node state machine with 1 symbol per node element. This implies an R-node state machine with R evaluation symbols, and $R^2$ arcs. In the example shown in FIG. 3(b), R=3. FIG. 3(b) thus illustrates how the state machine architecture can be streamlined to implement non-deterministic finite state automata for the evaluation of regular expressions.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Exemplary State Machine Evaluation Architecture

A state machine evaluation architecture is described that allows for efficient implementation and evaluation of state machines and finite state automata. In one embodiment, the apparatus employs a technique of building graphs using circuits in a way that enables, in a programmable manner, the physical realization of any arbitrary control flow graph in hardware. The apparatus provides a high performance and compact solution for implementation of multiple state machines as well as large and complex state machines. The apparatus can be used for efficient parsing and evaluation of data via the hierarchical application of thousands of regular expressions on the incoming data stream. Such an apparatus may be the central evaluation engine for a regular expression processor.

Figure 4:
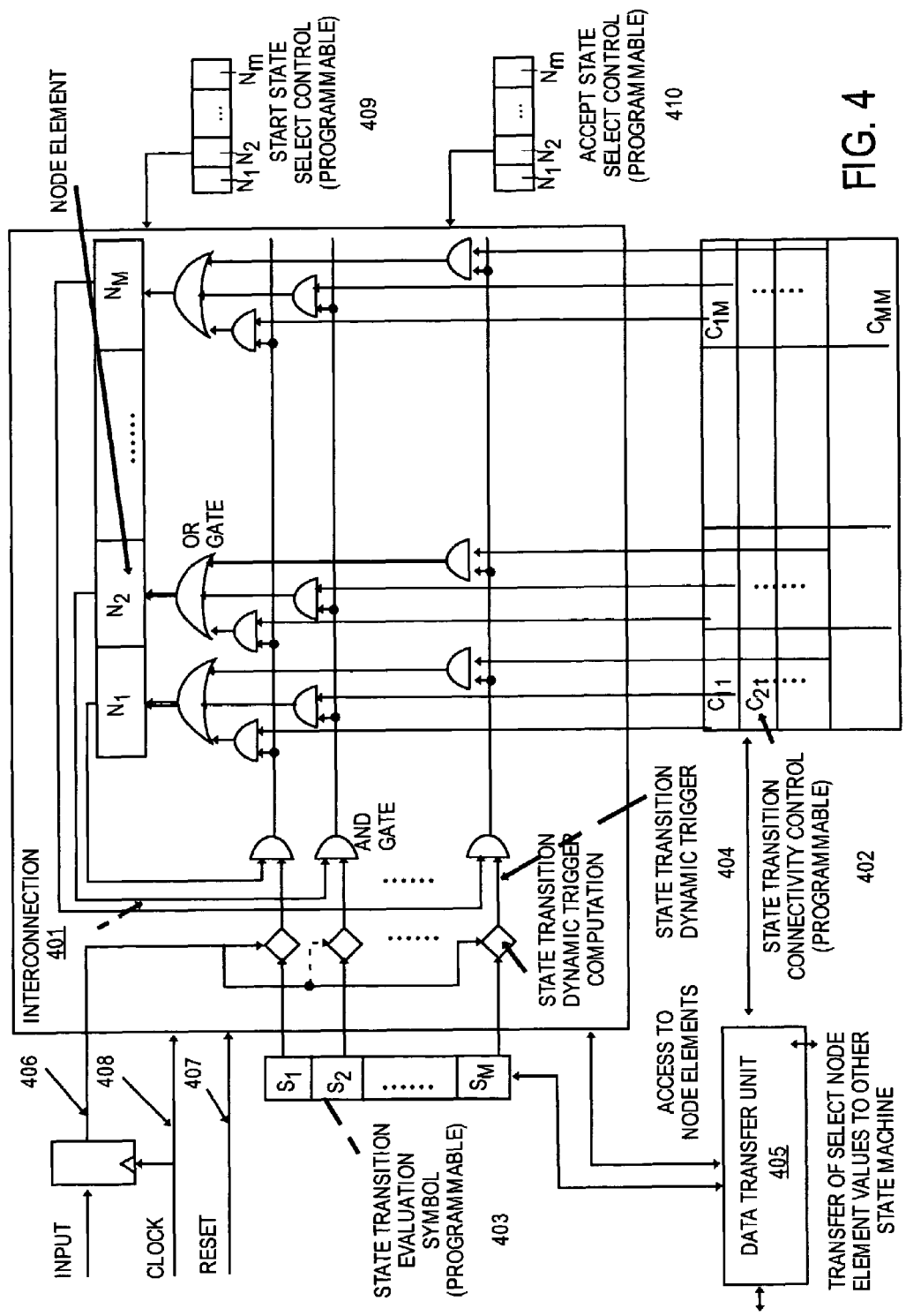
FIG. 4 illustrates one embodiment for a realization of a non-deterministic finite state automata using the state machine architecture.
Figure 5:
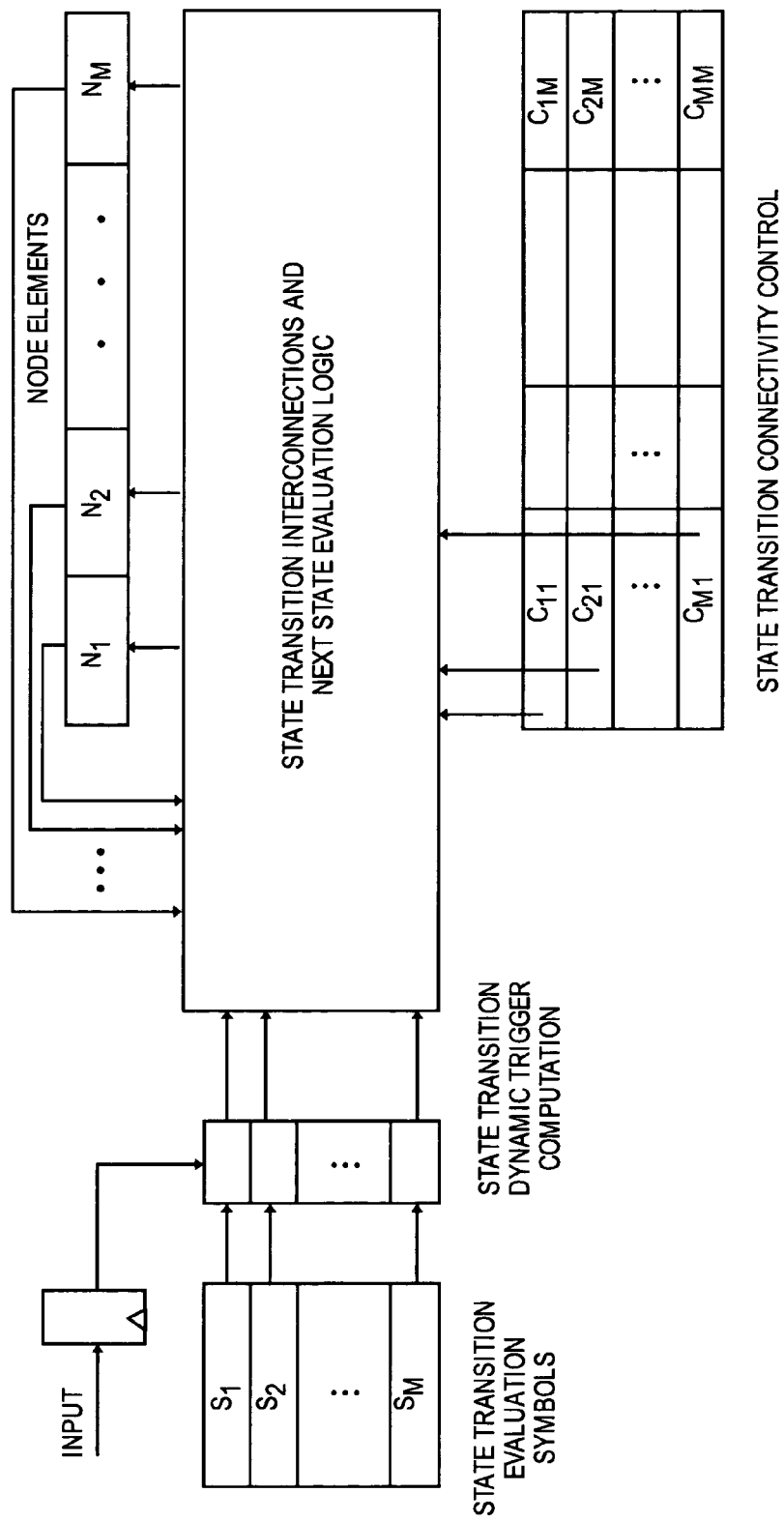
FIG. 5 is a high level block diagram of one embodiment of the state machine architecture for implementing finite state automata.

FIG. 4 illustrates one embodiment of the state machine architecture, as tailored for the realization of non-deterministic finite state automata and for the parallel evaluation of multiple regular expressions on input data. FIG. 4 shows a basic state machine evaluation building block. FIG. 5 is a high level block diagram of one embodiment of a state machine architecture in a simplified and abstracted form. Multiple building blocks can be combined to achieve parallel evaluation of multiple regular expressions.

Note that FIG. 3(b) shows the embodiment of the architecture for realization of a state machine for a non-deterministic finite state automata with R nodes, R symbols, and R^2 arcs. In FIG. 3(b), R=3. Note that R was set to 3 nodes for illustration purposes. Also note that in FIG. 3(b), there is one evaluation symbol for each node element N1, N2 and N3. FIG. 4 now shows an exemplary logic implementation of a state machine architecture for realization of a non-deterministic finite state automata with R nodes, R symbols, and R^2 arcs. In FIG. 4, R has been set to a variable M, and the hardware organization is designed and laid out to be scalable for any M. By fixing the value of M and providing the appropriate level of hardware, a machine with specifically M instantiated nodes can be realized.

On the embodiment described by FIG. 4, M is set to a value of either 16 or 32. The node elements N1-NM are embodied as flip-flops. For M=32, there are 32 node elements thereby enabling state machines with 32 states.

The node elements N1-NM are fully connected with interconnections 401. Each node element has an arc or interconnection to itself as well as to each of the other node elements. Hence, for M=32, there are 32×32 or 1024 interconnections 401. Likewise, for M=16, there are 16×16 or 256 interconnections 401.

For M=32, the state transition connectivity controls 402 comprise 1024 bits organized as a matrix of 32 bits×32 bits. Likewise, for M=16, the state transition connectivity controls 402 comprise 256 bits organized as a matrix of 16 bits×16 bits. A bit in row Y and column Z represents the control to enable or disable an interconnection between node element $N_Y$ and node element $N_Z$. The mechanism by which the interconnections 401 between node elements N1-NM can be enabled or disabled by the state transition connectivity controls 402 is embodied as a switch on the interconnection (e.g., wire) 401, with the switch being gated by the relevant control bit for that interconnection. This could be implemented using AND gate logic as well.

In this embodiment there are as many state transition evaluation symbols 403 as there are states in the machine. For M=32, there are 32 symbols. For M=16, there are 16 symbols. Each symbol could comprise a single 8-bit character value and compare operator, so that input data is specified for comparison to the 8-bit character value to compute the state transition dynamic trigger 404. In this embodiment, the logic for the state transition dynamic trigger 404 computation is simple—a fresh byte of input data is fed simultaneously to all M comparators. A set of M match lines act as state transition dynamic triggers. Once again, M is either 16 or 32.

The mechanism by which the state transition dynamic triggers 404 govern the update and transfer of values between node elements N1-NM (over interconnections 401 that have been enabled) is implemented in this embodiment as simple AND gate logic. That is, AND gates in cooperation with OR gates act to enable and/or disable interconnections 401.

The data transfer unit 405 dynamically configures and programs the state transition connectivity controls 402 and the state transition evaluation symbols 403. This enables dynamic realization of a range of control flow graph structures or configurations. In this embodiment, for M=32, the bit matrix for the state transition connectivity controls 402 can be implemented as 32 registers of 32 bits each. Likewise, for M=16, the bit matrix for the state transition connectivity controls 402 can be implemented as 16 registers of 16 bits each. In this embodiment, for M=32, the storage for the state transition evaluation symbols 403 can be implemented as 32 registers of 8 bits each. Likewise, for M=16, the storage for the state transition evaluation symbols 403 can be implemented as 16 registers of 8 bits each.

The data transfer unit 405 also provides access to read and write the node elements N1-NM. For M=32, the node elements could be viewed as a logical register of 32 bits. Likewise, for M=16, the node elements could be viewed as a logical register of 16 bits. The data transfer unit 405 executes load and store operations to read and write values from and into all these registers. This ability to read and write the node elements N1-NM can be used to enable the data transfer unit 405 to communicate with an external interconnect fabric to connect the state machine building block to other such building blocks, in order to construct larger state machines or graphs. The data transfer unit 405 outputs values from selected node elements on dedicated signal wires, which can be sent to, for example, other state machines or an external interconnect fabric. Likewise it receives values from the external interconnect fabric on dedicated signal wires. These values can be transferred into selected node elements.

A single reset signal 407 is fed to various elements of the apparatus to clear values to zero.

Before the start of the state machine evaluation, the state transition connectivity controls 402 and the state transition evaluation symbols 403 should have been programmed with desired configuration values. Hence the signal values in the storage assigned for these controls will be stable before the state machine evaluation begins.

In one embodiment, there is a mechanism to control the start of the state machine evaluation. In one embodiment, for M=32, the start state select controls 409 consist of a register of 32 bits. In one embodiment, for M=16, the start state select controls 409 consist of a register of 16 bits. Each bit in this register corresponds to a node element. Any number of bits in this register could be set to 1 (active). Upon initialization of the state machine, Node elements that correspond to active bits in the start state select controls 409 register will start as active states.

In one embodiment, the progress of the state machine evaluation is conditioned by a clock 408 that determines an evaluation cycle. In one embodiment, every evaluation cycle, a fresh byte of input data is presented to the apparatus, and this byte is evaluated in parallel against all state transition evaluation symbols (in this embodiment, this is a compare of the input byte versus the 8-bit character value), leading to an update of set of M match lines representing the state transition dynamic triggers 404. These M triggers 404, along with the $M^2$ bits corresponding to the state transition connectivity controls 402 combine with the current state values in the node elements N1-NM to compute the next state value for each node element. The logic equation for the computation of the next state of each node element is as follows:

If the state transition dynamic triggers are $T_1$ to $T_M$

If node elements are $N_1$ to $N_M$

If state transition connectivity controls are a bit matrix $C_{I,J}$ with I=1,M, and J=1,M Then, given previous state $PS_K$ for node element $N_K$, the next state $NS_K$ is as follows:

$$NS_K = OR(\\ [PS_1 \text{ AND } T_1 \text{ AND } C_{1,K}],\\ [PS_2 \text{ AND } T_2 \text{ AND } C_{2,K}],\\ \ldots\\ \ldots\\ [PS_I \text{ AND } T_I \text{ AND } C_{I,K}],\\ \ldots\\ \ldots\\ [PS_M \text{ AND } T_M \text{ AND } C_{M,K}]\\ )$$

Effectively, for each node element, the next state computation is a large OR function of M terms. Each term is computed by ANDing together 3 values—the previous state value of a node element, the corresponding dynamic trigger, and the corresponding connectivity control bit that indicates whether that particular interconnection 401 is enabled.

Once the next state computation is complete, the Node Elements are updated with the next state values, and the state machine completes a single evaluation cycle. As can be seen by the logic equations for the next state computation, the evaluation cycle time for the apparatus is three levels of logic evaluation. The first level comprises of AND gates to compute the triggers, the second level comprises of AND gates to factor in the connectivity controls, and finally an M-input OR gate. This evaluation cycle time is considerably shorter than the cycle time that governs the operating frequency of commercial microprocessors.

Note that the sequence of steps described above represent the computation needed in a single logical evaluation cycle. Physically speaking, additional pipelining is possible, to further boost the frequency of operations. For example, the computation of the state transition dynamic triggers (given a fresh byte of input data) can be decoupled from the next state evaluation.

In one embodiment, there is a mechanism to control the halting of the state machine evaluation. For M=32, the accept state select controls 410 consist of a register of 32 bits. For M=16, the accept state select controls 410 consist of a register of 16 bits. Each bit in this register corresponds to a node element. Any number of bits in this register could be set to 1 (active). Once the state machine enters into any of these states (corresponding node element goes active), the state machine halts it's evaluation.

The foregoing provided a description of the evaluation cycle for a single state machine building block. When such a block is coupled to other state machines via the external interconnect fabric, an additional synchronization handshake would be incurred to enable the evaluation cycles of the various machines to be coordinated.

Figure 6:
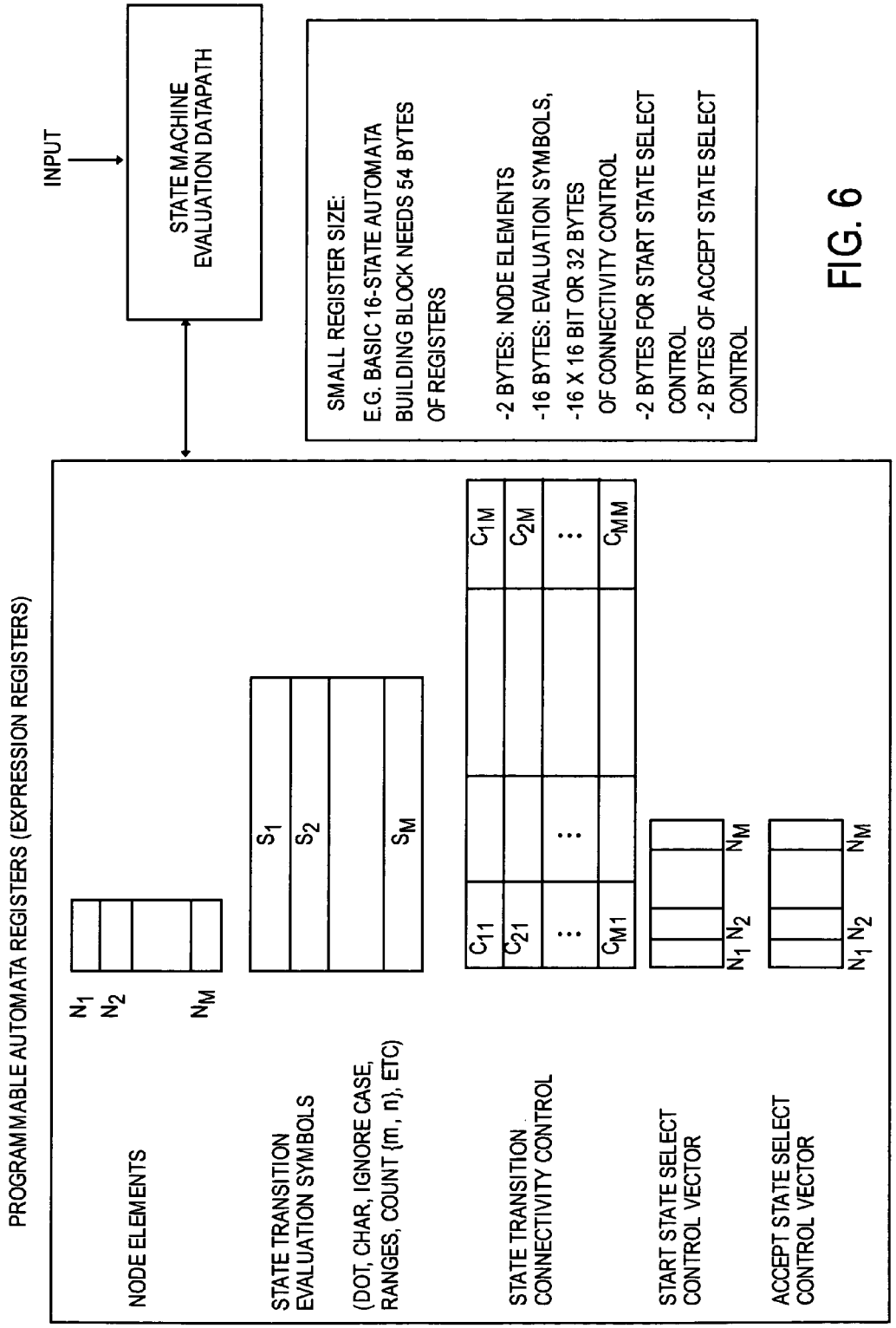
FIG. 6 shows the programmer's view of one embodiment of the state machine architecture for implementing finite state automata.

FIG. 6 shows the programmer's view of one embodiment of the state machine apparatus. The state machine architecture appears to the programmer as a set of registers. FIG. 6 shows registers for the following: Node Elements, State Transition Evaluation Symbols, State Transition Connectivity Controls, Start State Select Control Vector, and Accept State Select Control Vector. Note that embodiments of the apparatus are efficient in terms of the storage needed to represent the state machine. For a 16-node machine, only 54 bytes of registers are needed.

Figure 7:
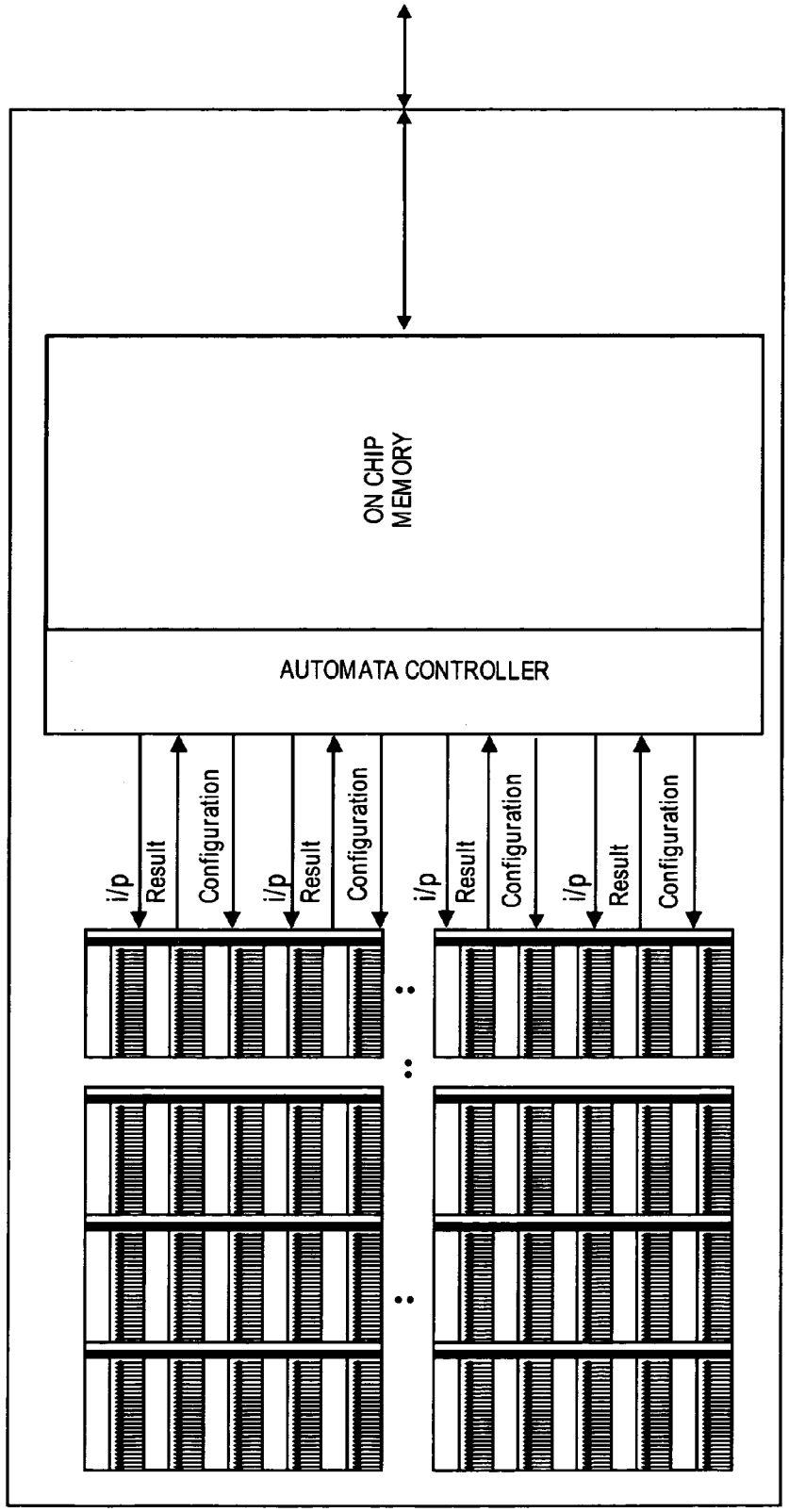
FIG. 7 shows the use of the apparatus in an embodiment for implementing thousands of finite state automata on an integrated circuit chip.

FIG. 7 shows the use of the apparatus in an embodiment for implementing thousands of finite state automata on a chip. The regular and compact datapath for a single state machine is instantiated multiple times, leading to a dense array of multiple rows or tiles. Several thousand automata can be accommodated on a single chip.

Note that while the description of the exemplary architecture described one embodiment of the apparatus, multiple alternate embodiments are possible.

The exemplary apparatus employed a solution, which provides for as many state transition evaluation symbols as there are node elements. In another embodiment of the state machine architecture, there are as many symbols as there are interconnections, so that for M=32, there could be 32×32 or 1024 symbols, each governing one of 1024 possible state transitions.

Figure 8A:
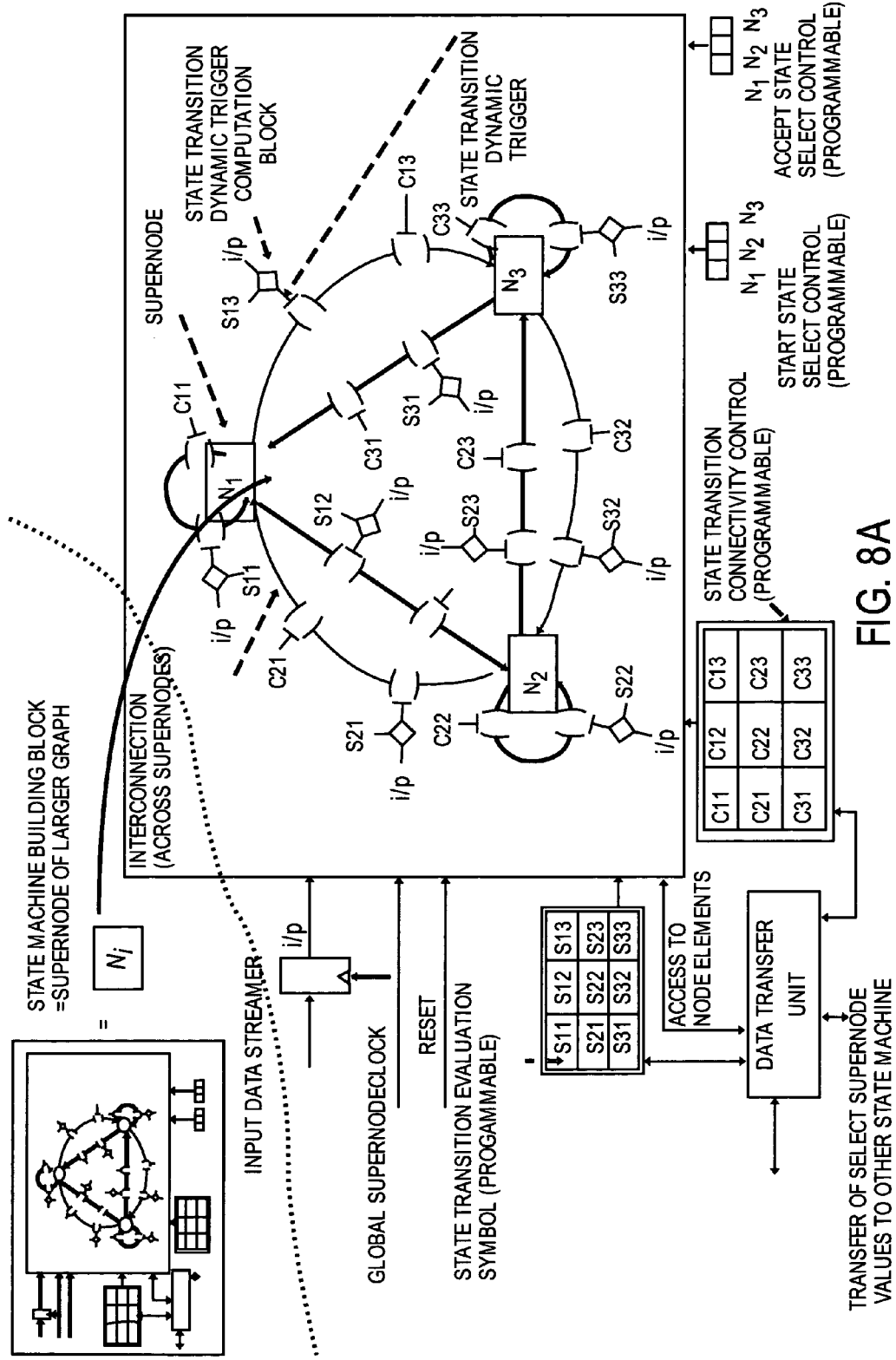
FIG. 8(a) shows an embodiment of the state machine architecture that enables realization of larger state machines by hierarchical use of the state machine building block in a larger graph
Figure 8B:
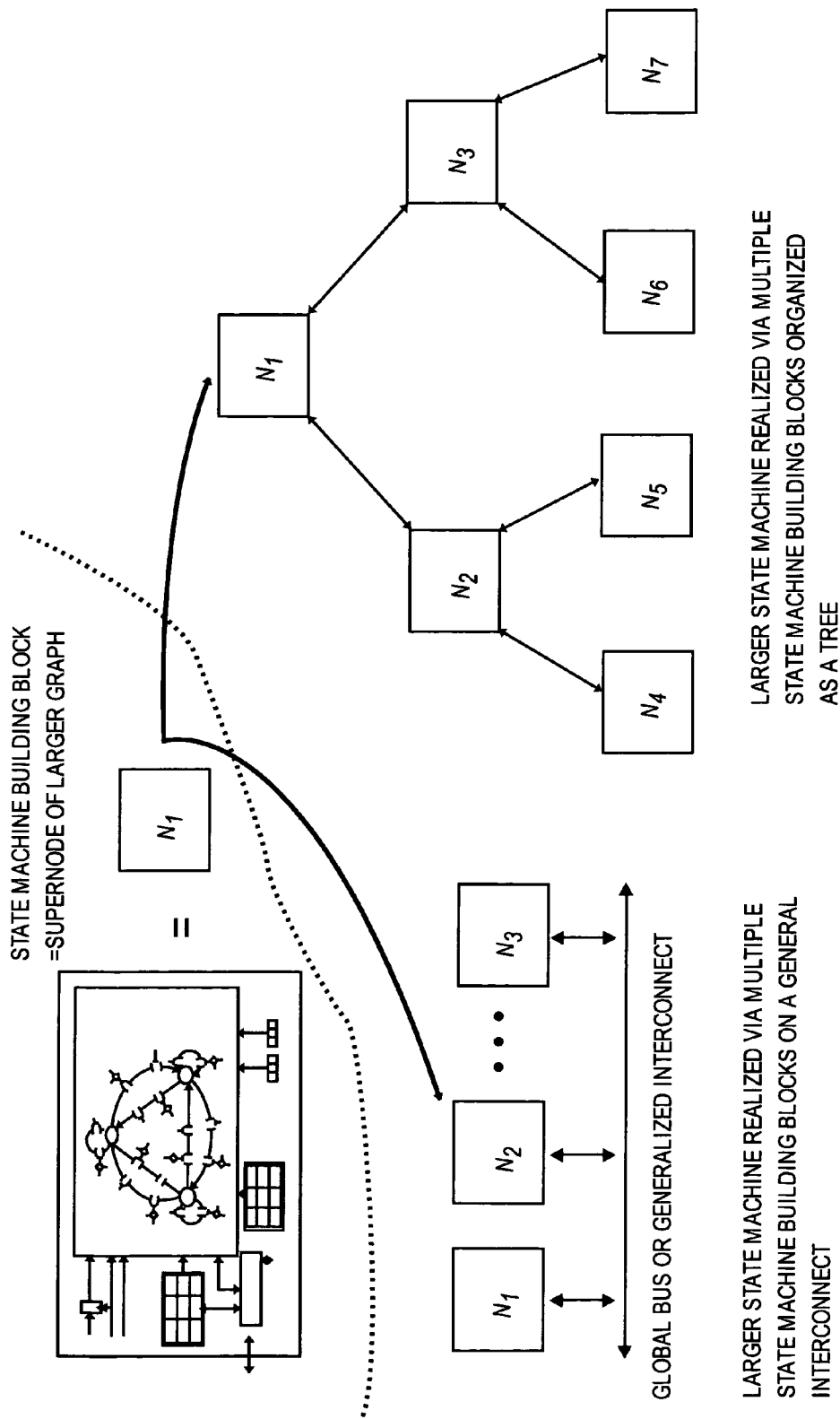
FIG. 8(b) shows an embodiment of the state machine architecture that enables realization of larger state machines by using the state machine building block in a larger graph

Constructing Larger State Machines Using a Building Block of the State Machine Architecture FIG. 8(*a*) shows an embodiment of the state machine architecture that enables realization of larger state machines by hierarchical use of the state machine building block in a larger graph. An embodiment of the state machine architecture with a select number of instantiated nodes is chosen as a building block. In one embodiment, the building block could be as described in FIG. 2. In another embodiment, the building block could be as described in FIG. 4. This building block is then treated as a supernode for a larger graph. Thus the larger graph that implements the larger state machine is composed of multiple supernodes. These supernodes are connected using the same techniques that characterize the state machine architecture. A global clock or supernode clock is used as the synchronizing mechanism which governs the evaluation of the larger graph. Using this technique, larger state machines can be constructed by hierarchical use of the state machine building block.

FIG. 8(*b*) shows an embodiment of the state machine architecture that enables realization of larger state machines by using alternative methods of interconnecting the building blocks to realize larger state machines. An embodiment of the state machine architecture with a select number of instantiated nodes is chosen as a building block. In one embodiment, the building block could be as described in FIG. 2. In another embodiment, the building block could be as described in FIG. 4. This building block is then treated as a supernode for a larger graph. Thus the larger graph that implements the larger state machine is composed of multiple supernodes. FIG. 8(*b*) shows two alternative methods of interconnecting the building blocks to realize larger state machines. In one embodiment, all the supernodes or state machines are coupled directly to a global communication bus, and communicate with one another via this bus. In another embodiment, the supernodes are organized as a tree. Using this method, a hierarchically organized tree of state machines can be implemented and evaluated against input data.

FIG. 9(a) illustrates storage and performance benefits of an embodiment of exemplary state machine architecture on state machine techniques over the prior art. As can be seen from the table in FIG. 9(a), the exemplary architecture simultaneously provides the benefits of reduced storage for the states of the automata, along with the benefits of very high evaluation speed. Since the exemplary state machine architecture implements an NFA, the storage for the states of the state machine is proportional to the number of nodes in the automata (for an R-character regular expression, this is proportional to R). The speed of evaluation is significantly faster than what is possible using commercial microprocessors.

Figure 9B:
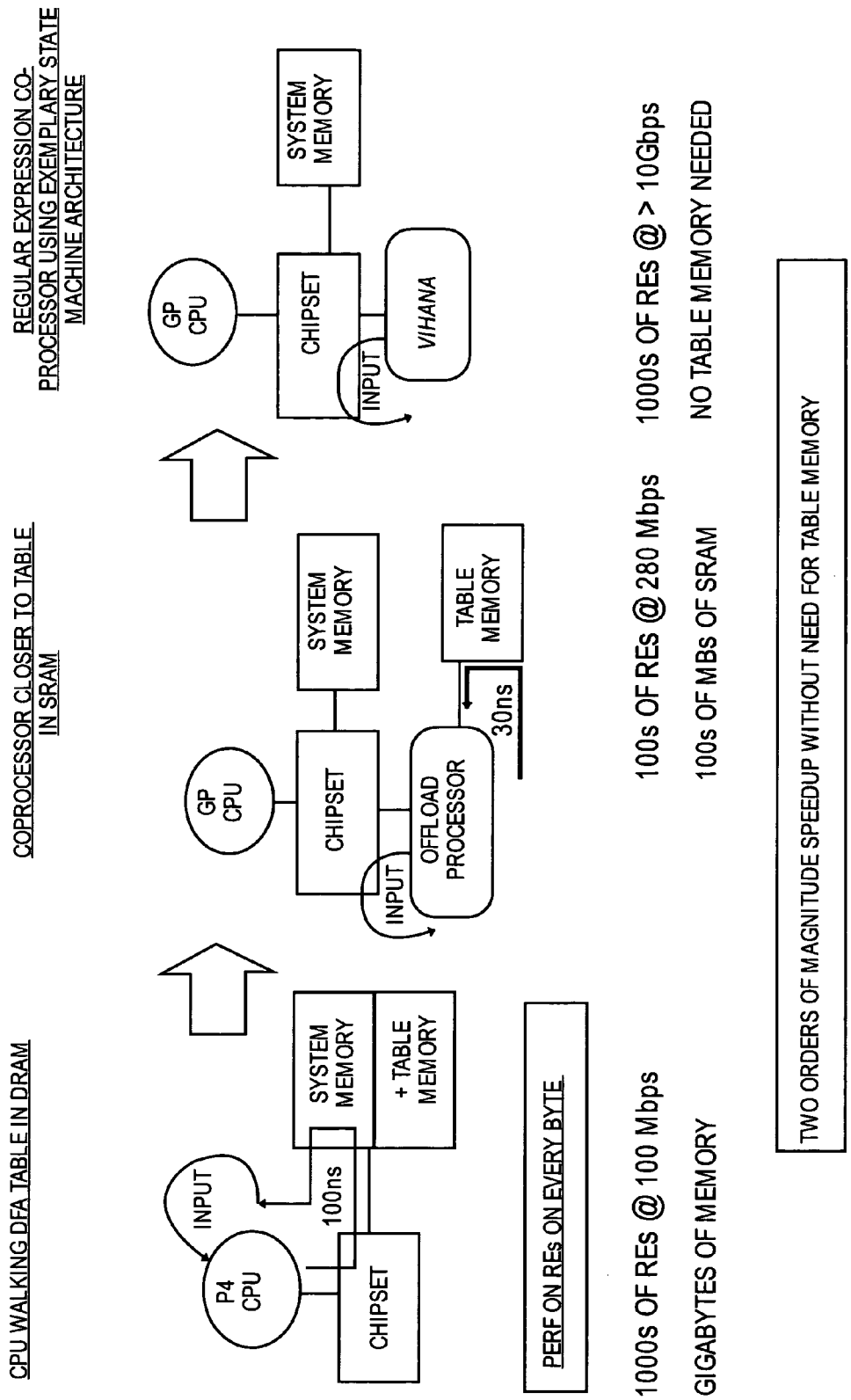
FIG. 9(b) illustrates the elimination of the memory bottleneck by using an embodiment of the state machine architecture

FIG. 9(b) illustrates the elimination of the memory bottleneck by using an embodiment of the state machine architecture. Since the exemplary state machine architecture implements an NFA, the storage for the states of the state machine is proportional to the number of nodes in the automata (for an R-character regular expression, this is proportional to R). This is significantly smaller than the storage needed for a DFA-based approach. The storage is small enough that it allows thousands of such state machines to be accomodated on a single chip. There is no need to access any external memory during the critical evaluation cycle time of the exemplary state machine apparatus. Thus, the solution eliminates the memory bottleneck that limits the performance of the microprocessor based approach.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

We claim:

1. A hardware architecture for the implementation of computational and control flow graphs, the architecture comprising:
   a plurality of node elements, wherein each of the plurality of node elements represents a node of a control flow graph;
   a plurality of interconnections to connect node elements, wherein each interconnection in the plurality of interconnections represents a distinct transition in the control flow graph;
   a plurality of connectivity control logic to independently enable and disable each of the connections within the plurality of interconnections to form the control flow graph with the plurality of node elements, the control flow graph being one of multiple possible control flow graphs implementable by enabling and disabling an arbitrary set of the connections within the plurality of interconnections; and
   a plurality of evaluation logic elements coupled to the interconnections and operable to evaluate input data against criteria, the plurality of evaluation logic elements to control one or more transitions between node elements in the control flow graph.

2. The architecture defined in claim 1 wherein the criteria comprises evaluation symbols containing specifications for one or more of the group consisting of operations and data.

3. The architecture defined in claim 2 wherein the evaluation symbols are programmable.

4. The architecture defined in claim 1 further comprising a data transfer unit through which dynamically computed data is sent to the connectivity control logic.

5. The architecture defined in claim 1 wherein the connectivity control logic comprises a plurality of storage elements, where each storage element in the plurality of storage elements stores a value used to enable or disable an interconnection between node elements in the plurality of interconnections.

6. The architecture defined in claim 1 wherein the connectivity control logic is programmable.

7. The architecture defined in claim 1 wherein the evaluation criteria are programmable.

8. The architecture defined in claim 1 wherein the connectivity control logic and the evaluation symbols are programmable.

9. The architecture defined in claim 1 further comprising at least one trigger signal coupled to the plurality of interconnections to gate a transition across an interconnection in the plurality of interconnections.

10. The architecture defined in claim 9 wherein the at least one trigger signal is generated in response to the set of evaluation logic.

11. The architecture defined in claim 1 wherein each of the plurality of node elements comprises a storage element to store a value representing a state of the control flow graph.

12. The architecture defined in claim 1 wherein the set of evaluation logic comprises a plurality of comparators to compare the input data to the criteria.

13. The architecture defined in claim 1 wherein the architecture is configured to begin evaluation with a set of programmable start states initialized to be active.

14. The architecture defined in claim 1 wherein the architecture is configured to perform recognition with an accept state defined to terminate evaluation when reached.

15. The architecture defined in claim 1 wherein the plurality of interconnections comprises a plurality of wires.

16. The architecture defined in claim 1 wherein the connectivity control logic comprises a plurality of switches.

17. The architecture defined in claim 16 wherein switches in the plurality of switches are implemented with logic gates.

18. The architecture defined in claim 1 wherein the control flow graph comprises M nodes, $M^2$ arc transitions and $M^2$ symbols for evaluation, where M is an integer.

19. The architecture defined in claim 18 wherein M is one of a group consisting of 16 and 32.

20. The architecture defined in claim 1 wherein the control flow graph comprises M nodes, $M^2$ are transitions and M symbols for evaluation, where M is an integer.

21. The architecture defined in claim 20 wherein M is one of a group consisting of 16 and 32.

22. An architecture for the implementation of computational and control flow graphs, the architecture comprising:
   a plurality of supernodes,
   a plurality of interconnections to connect supernode elements;
   a plurality of connectivity control logic to enable and disable connections within the plurality of interconnections to form a first control flow graph with the plurality of node elements; and
   a plurality of evaluation logic coupled to the interconnections and operable to evaluate input data against criteria, the plurality of state transition evaluation logic to control one or more state transitions between supernode elements in the first control flow graph,
wherein one of the plurality of supernodes comprises a control flow graph having
- a plurality of node elements, wherein each of the plurality of node elements represents a node of a second control flow graph;
- a plurality of interconnections to connect node elements;
- a plurality of connectivity control logic to enable and disable connections within the plurality of interconnections to form a second control flow graph with the plurality of node elements; and
- a plurality of evaluation logic coupled to the interconnections and operable to evaluate input data against criteria, the plurality of evaluation logic to control one or more transitions between node elements in the second control flow graph.

23. A hardware architecture for implementing computational and control flow graphs for realization of programmable non-deterministic Finite State Automata to evaluate regular expressions, the hardware architecture comprising: a control flow graph comprises of M nodes, $M^2$ arcs, $M^2$ symbols for evaluation and $M^2$ storage elements, where M is an integer, and wherein the M nodes are potentially fully connectable to each other using the $M^2$ arc transitions, wherein each of the $M^2$ storage elements stores a value used to independently enable or disable an associated one of the $M^2$ arc transitions between the M nodes, and wherein input data is compared against $M^2$ symbols to determine whether control transitions across the $M^2$ arcs should exist.

24. The hardware architecture defined in claim 23 wherein the input data is compared against M symbols organized as one symbol per node to control interconnections to or from that node, wherein comparisons against the M symbols are used to determine whether control transitions across the $M^2$ arcs should exist.

* * * * *